United States Patent
Holenstein et al.

(10) Patent No.: US 10,474,695 B1
(45) Date of Patent: *Nov. 12, 2019

(54) METHOD FOR REPLACING A CURRENTLY OPERATING DATA REPLICATION ENGINE WITH A NEW DATA REPLICATION ENGINE WITHOUT APPLICATION DOWNTIME AND WHILE PRESERVING TARGET DATABASE CONSISTENCY

(71) Applicant: Gravic, Inc., Malvern, PA (US)

(72) Inventors: Paul J. Holenstein, Downingtown, PA (US); Bruce D. Holenstein, Media, PA (US); John R. Hoffmann, Kennett Square, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,049

(22) Filed: May 20, 2019

Related U.S. Application Data

(63) Continuation-in-part of application No. 15/838,991, filed on Dec. 12, 2017, now Pat. No. 10,303,699.

(Continued)

(51) Int. Cl.
*G06F 16/27* (2019.01)
*G06F 16/23* (2019.01)

(52) U.S. Cl.
CPC ........ *G06F 16/273* (2019.01); *G06F 16/2365* (2019.01); *G06F 16/2379* (2019.01)

(58) Field of Classification Search
None
See application file for complete search history.

(56) References Cited

U.S. PATENT DOCUMENTS 6,122,630 A 9/2000 Strickler et al.
7,039,663 B1 * 5/2006 Federwisch ......... G06F 11/1451

(Continued)

OTHER PUBLICATIONS

Hitachi. "Setting the transaction timeout". 2013. uCosminexus Application Server, System Design Guide. URL Link: http://itdoc.hitachi.co.jp/manuals/3020/30203Y0410e/EY040205.HTM. Accessed Oct. 2018. (Year: 2013).*

(Continued)

*Primary Examiner* — Neveen Abel Jalil
*Assistant Examiner* — Irene Baker
(74) *Attorney, Agent, or Firm* — Panitch Schwarze Belisario & Nadel LLP

(57) ABSTRACT

An automated method is provided for replacing a currently operating data replication engine with a new data replication engine. A currently operating data replication engine reports its audit trail position upon stopping. The new data replication engine starts and is positioned at an audit trail position which is prior to the reported stopped audit trail position by an amount of the audit trail which corresponds to time that is equal to or greater than a source database transaction abort timer. The position of the new data replication engine to the stopped audit trail position defines a position window. Audit trail transactions are processed in the position window by the new data replication engine by ignoring transactions which committed or aborted in the position window, and replicating remaining transactions in the position window from the source database to the target database. The new data replication engine replicates all transactions that are started after the stopped audit trail position.

3 Claims, 16 Drawing Sheets

Changing a Data Replication Engine - Brute Force Method

Related U.S. Application Data

(60) Provisional application No. 62/436,581, filed on Dec. 20, 2016.

(56) References Cited

U.S. PATENT DOCUMENTS

| | | | | |
|---|---|---|---|---|
| 7,730,489 | B1* | 6/2010 | Duvur | G06F 9/466 714/2 |
| 7,882,062 | B2 | 2/2011 | Holenstein et al. | |
| 8,903,779 | B1* | 12/2014 | Holenstein | G06F 11/1469 707/685 |
| 9,804,935 | B1* | 10/2017 | Holenstein | G06F 11/1469 |
| 9,830,223 | B1* | 11/2017 | Holenstein | G06F 11/1469 |
| 2002/0049776 | A1* | 4/2002 | Aronoff | G06F 16/178 |
| 2002/0194204 | A1* | 12/2002 | Mosher, Jr. | G06F 11/1471 |
| 2004/0260726 | A1* | 12/2004 | Hrle | G06F 11/1466 |
| 2005/0080843 | A1 | 4/2005 | Cabrera et al. | |
| 2008/0091837 | A1* | 4/2008 | Langen | H04L 65/40 709/230 |
| 2009/0144337 | A1* | 6/2009 | Barsness | G06F 16/2379 |
| 2018/0096066 | A1* | 4/2018 | Venkataramanappa | G06F 16/2379 |

OTHER PUBLICATIONS

Microsoft Developer. "System.Transactions and Timeout". Dec. 16, 2005. Microsoft Developer. URL Link: https://blogs.msdn.microsoft.com/dotnetinterop/2005/12/16/system-transactions-and-timeout/. Accessed Oct. 2018. (Year: 2005).*

Oracle. "To seta transaction timeout value". Sep. 15, 2014 snapshot via Archive.org. Sun GlassFish Enterprise Server v2.1.1 Administration Guide. URL Link: https://docs.oracle.com/cd/E19575-01/821-0185/ablsu/index.html. Accessed Oct. 2018. (Year: 2014).*

Red Hat. "JBoss TS Programmers Guide for use with JBoss Enterprise Application Platform 4.2". 2010. Red Hat Documentation Group. URL Link: https://access.redhat.com/documentation/en-us/jboss_enterprise_application_platform/4.2/html-single/jboss_transactions_programmers_guide/. Accessed Oct. 2018. (Year: 2010).*

Spring. "Transaction Management". Nov. 18, 2015 snapshot via Archive.org. Spring Framework Reference, version 4.2.x. URL Link: https://docs.spring.io/spring/docs/4.2.x/spring-framework-reference/html/transaction.html. Accessed Oct. 2018. (Year: 2015).*

Sybase. "Transaction tinneout". Jan. 2005. EA Server Version 5.2 Performance and Tuning Guide. pp. 106-107. URL Link: http://infocenter.sybase.com/help/index.jsp?topic=/com.sybase.help.eas_5.2.easperf/html/easperf/CHDEFFDG.htm. Accessed Oct. 2018. (Year: 2005).*

Guo et al. "Pervasive Computing". Aug. 5, 2016. CRC Press. ISBN: 978-1-4665-9627-6. Accessed May 2018. (Year: 2016).*

Klein et al. "An Introduction to IMS: Your Complete Guide to IBM Information Management System". Mar. 13, 2012. IBM Press. ISBN: 978-0-13-288687-1. Accessed May 2018. (Year: 2012).*

B. Holenstein et al., "Breaking the Availability Barrier: Survivable Systems for Enterprise Computing II," Chapter 8, "Eliminating Planned Outages with Zero Downtime Migrations," 2007, Author House, 33 pages.

Hitachi. "Selling the transaction timeout". 2013. uCosminexus Application Server, System Design Guide. URL Link: http://itdoc.hitachi.co.jp/manuals/3020/30203Y041 0e/EY040205.HTM. Accessed Oct. 2018. (Year: 2013).

Sybase. "Transaction timeout". Jan. 2005. EA Server Version 5.2 Performance and Tuning Guide. pp. 106-107. URL Link: http:// i nfocenter.sybase .com/hel p/index.jsp?topic=/com .sybase. hel p. eas_5 .2 .easperf/html/easperf/CHDE FFDG .htm. Accessed Oct. 2018. (Year: 2005).

Guo et al. "Pervasive Computing". Aug. 5, 2016. CRC Press. ISBN: 978-1-4665-9627-6. Accessed May 2018.

Klein et al. "An Introduction to IMS: Your Complete Guide to IBM Information Management System". Mar. 13, 2012. IBM Press. ISBN: 978-0-13-288687-1. Accessed May 2018.

Wikipedia. "Two-phase commit protocol". Oct. 12, 2016 snapshot via Archive.org. URL Link: https://en.wikipedia.org/wiki/Two-phase_commit_protocol. Accessed May 2018.

* cited by examiner

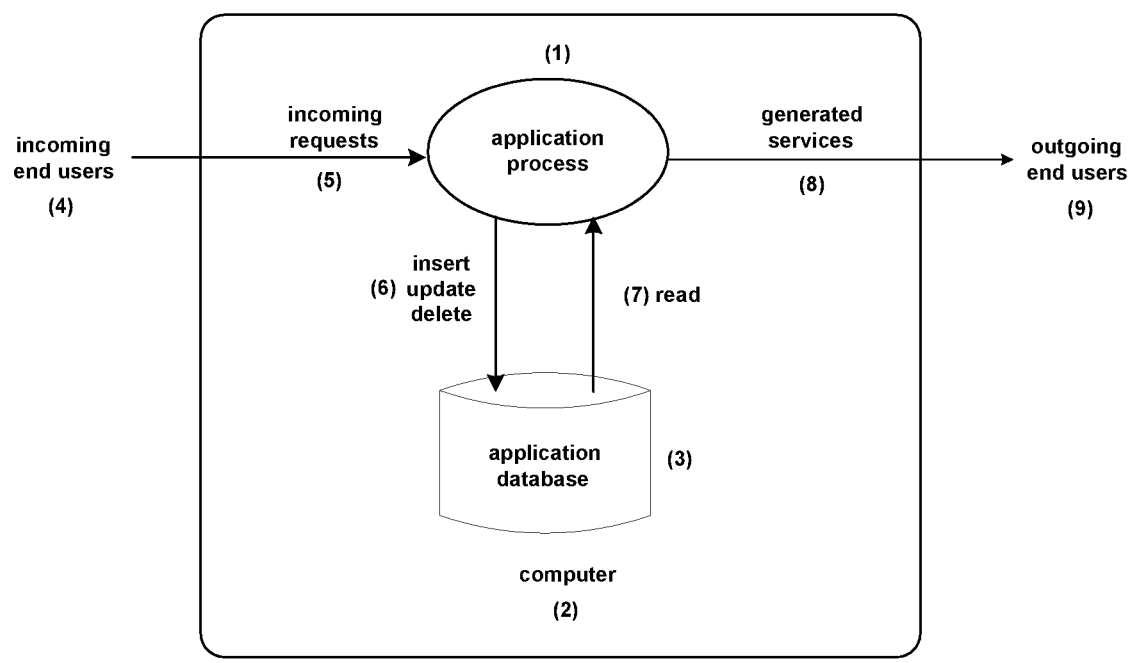
Figure 1: Prior Art - A Computer Application

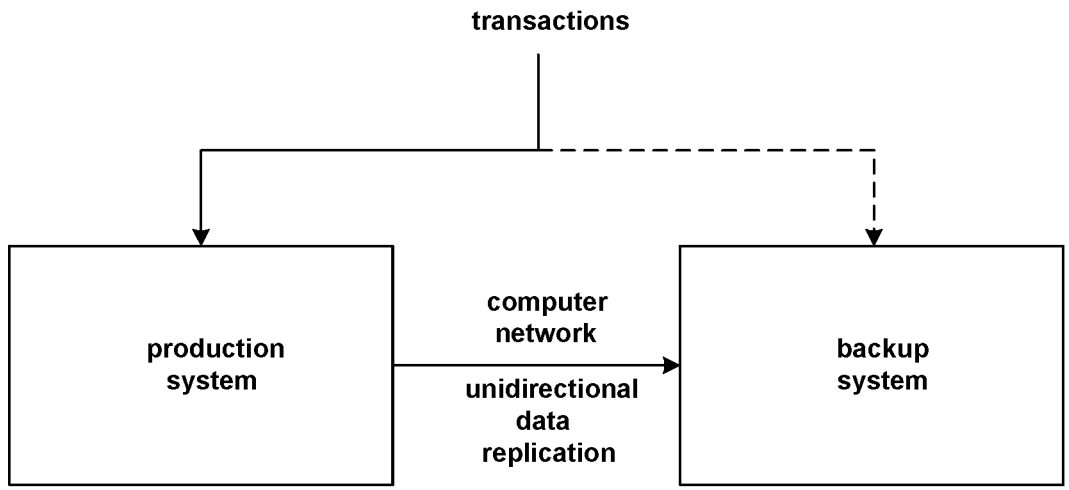
Figure 2: Prior Art - An Active/Backup System
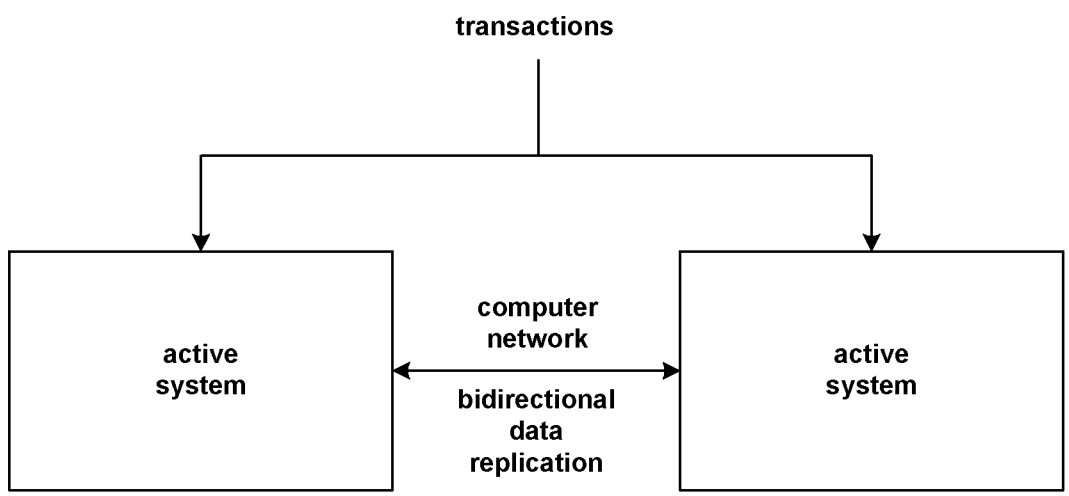
Figure 3: Prior Art - An Active/Active System

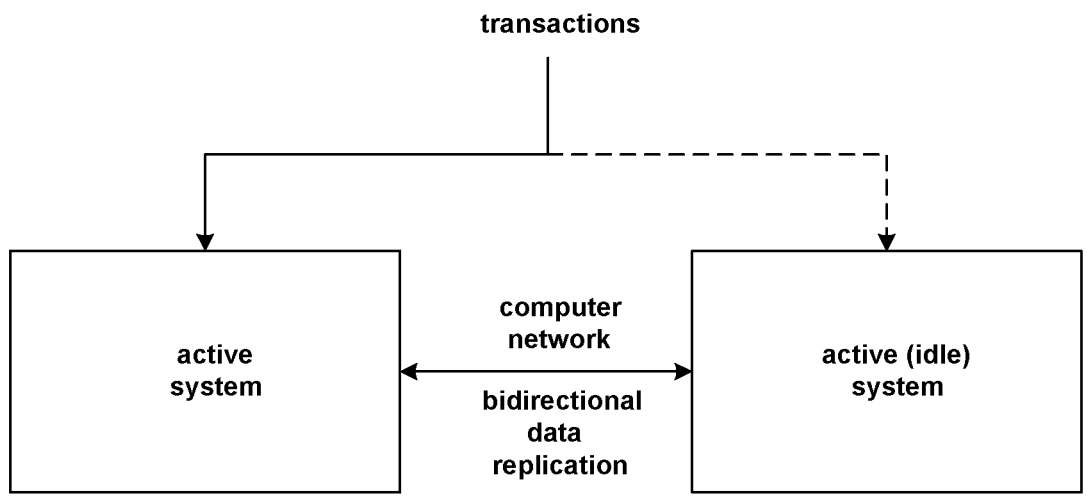
Figure 4: Prior Art: Sizzling-Hot-Takeover System

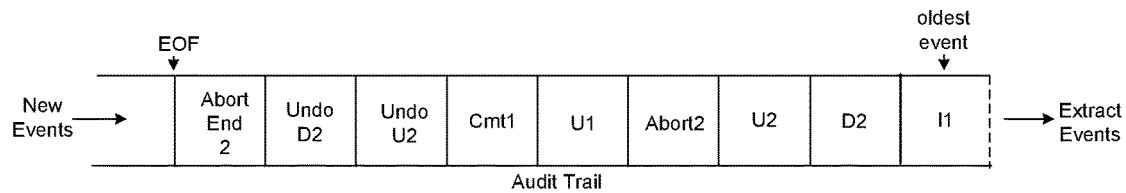
Figure 5: Prior Art - Audit Trail Contents for tx1, tx2
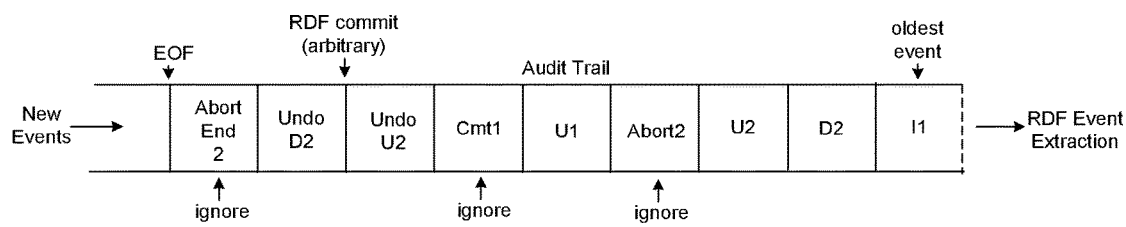
Figure 6: Prior Art - RDF Processing of the Audit Trail
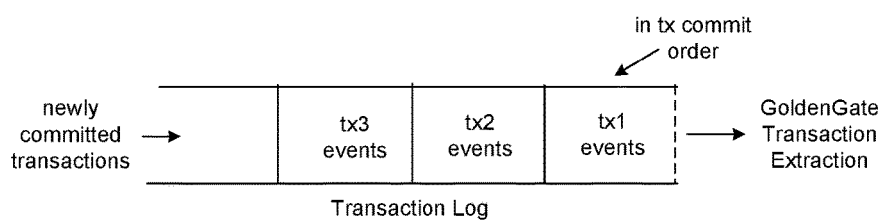
Figure 7: Prior Art - Oracle GoldenGate Transaction Log
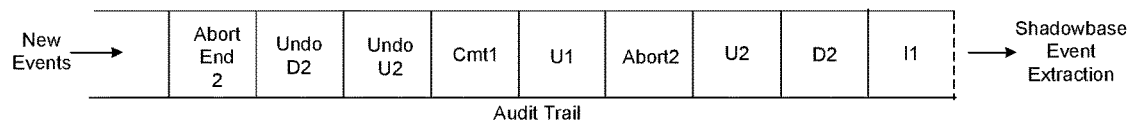
Figure 8: Prior Art - Shadowbase Processing of the Audit Trail

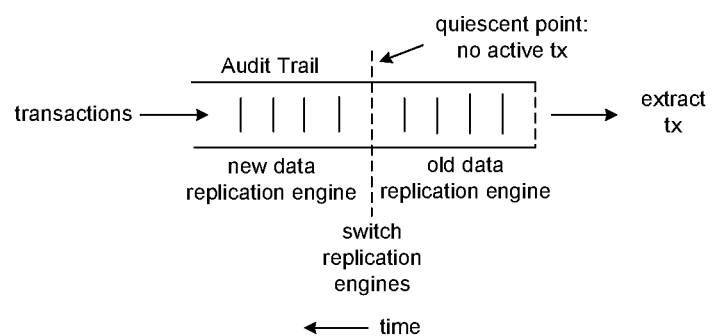
Figure 9: Prior Art - Changing Data Replication Engines by Quiescing the Application
(Application Outage)

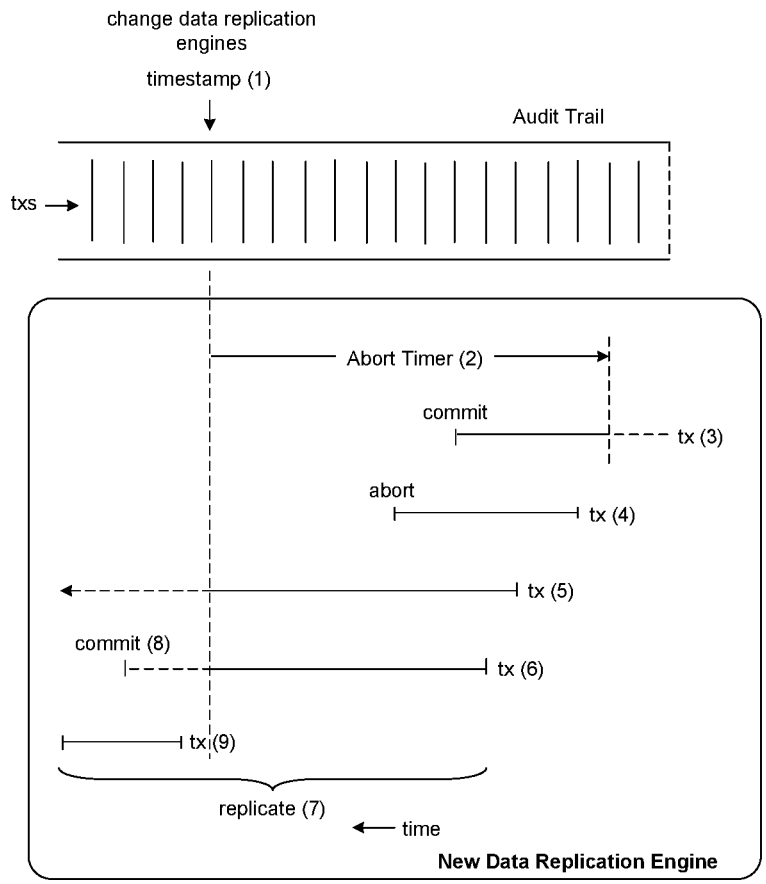

tx (3) – started before Abort Timer timestamp (1) minus the Abort Time and committed before data replication engines are changed.
tx (4) – started after Abort Timer timestamp (1) minus the Abort Time and aborted before data replication engines are changed.
tx (5) – started after Abort Timer timestamp (1) minus the Abort Time and still in progress when data replication engines are changed.
tx(6) – started after Abort Timer timestamp (1) minus the Abort Time and committed after data replication engines are changed.
tx (9) – started after data replication engines were changed (the new data replication engine will replicate it).

Figure 10: Changing a Data Replication Engine - Brute Force Method

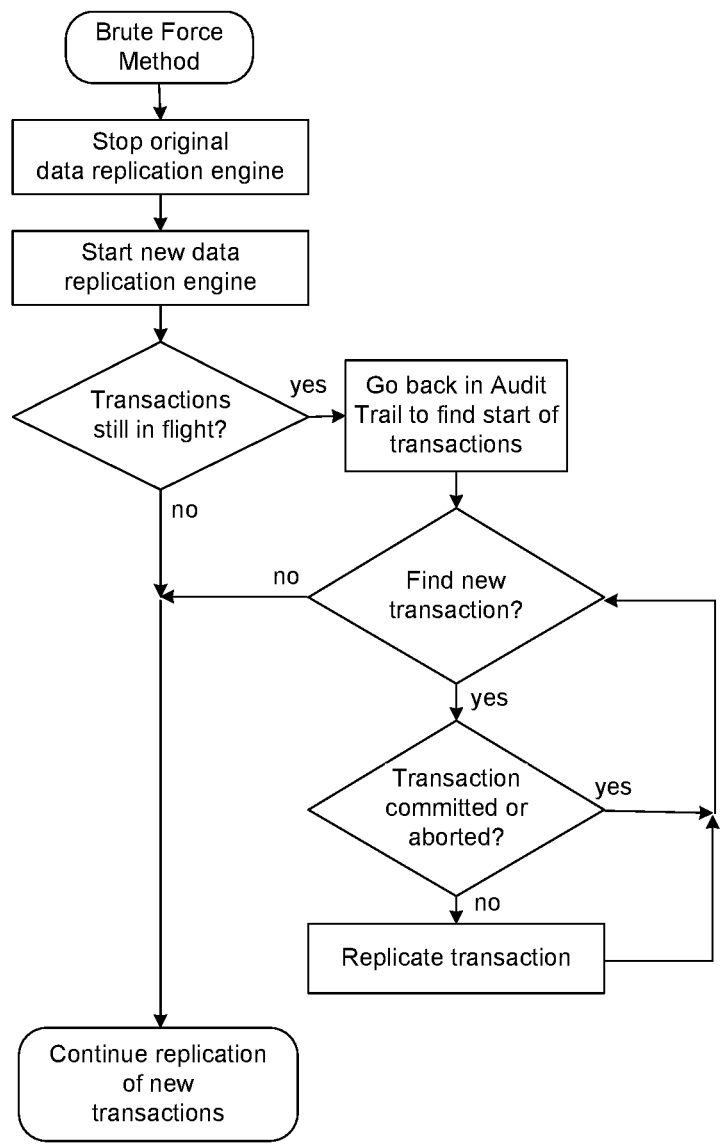
Figure 11: Brute Force Method Flow Chart

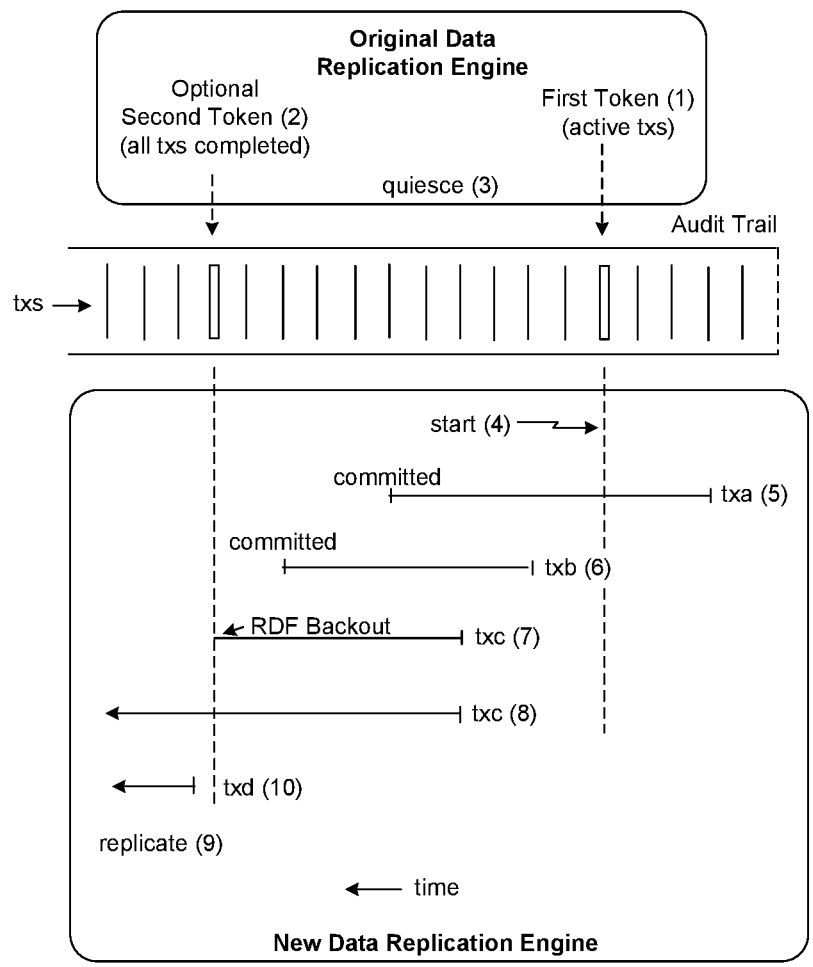
Figure 12: Changing a Data Replication Engine - Token Method

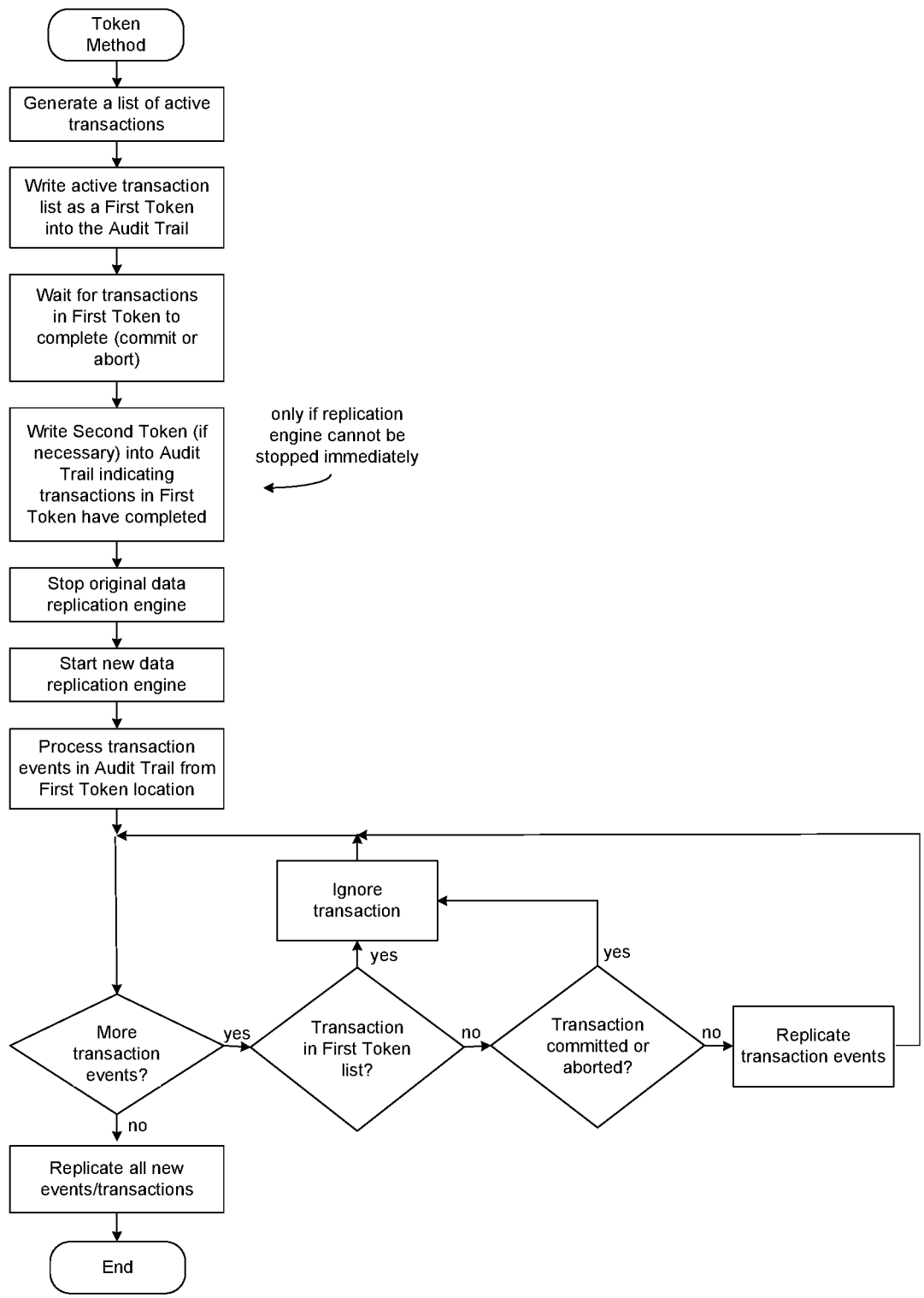
Figure 13: Token Method Flow Chart

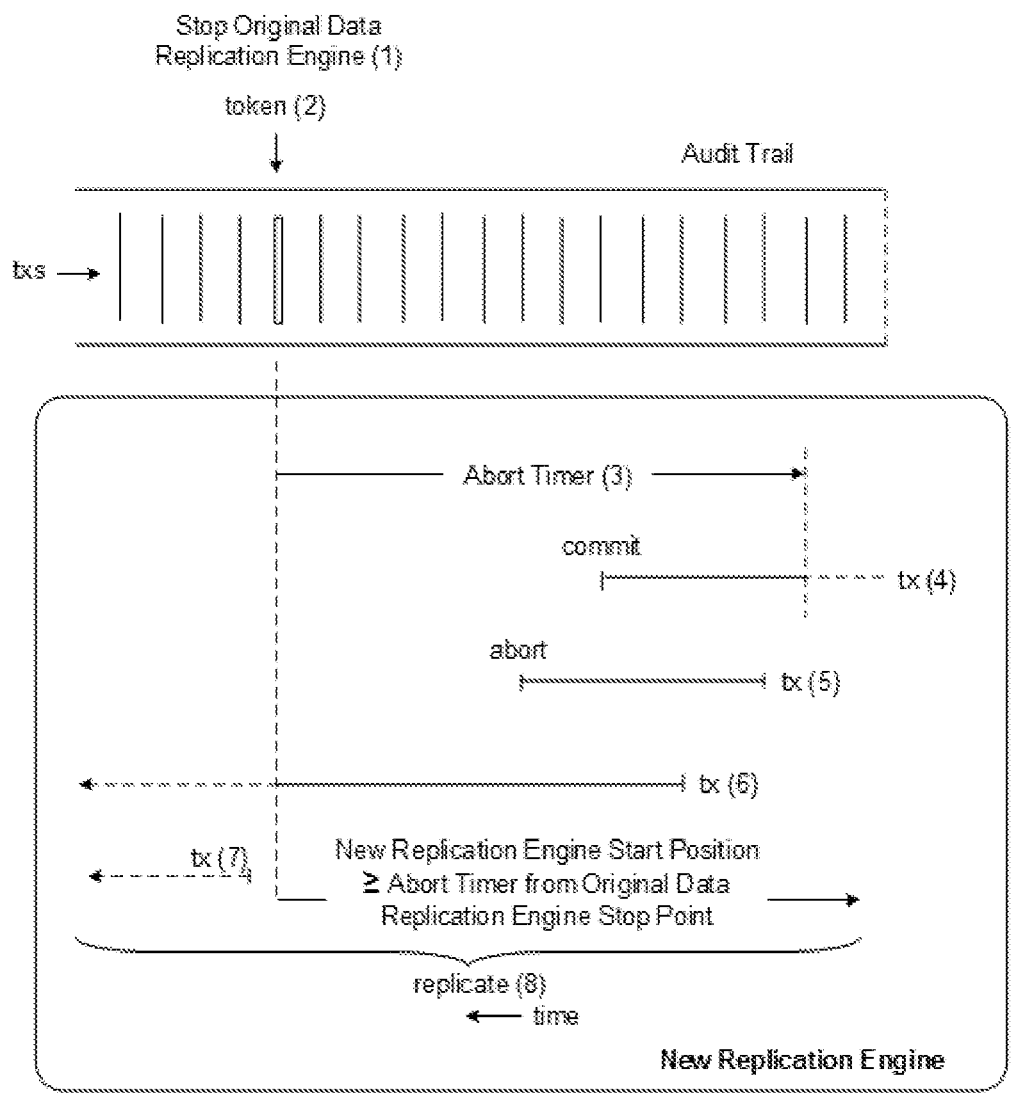
Figure 14: Changing a Data Replication Engine - Simplified Token Method

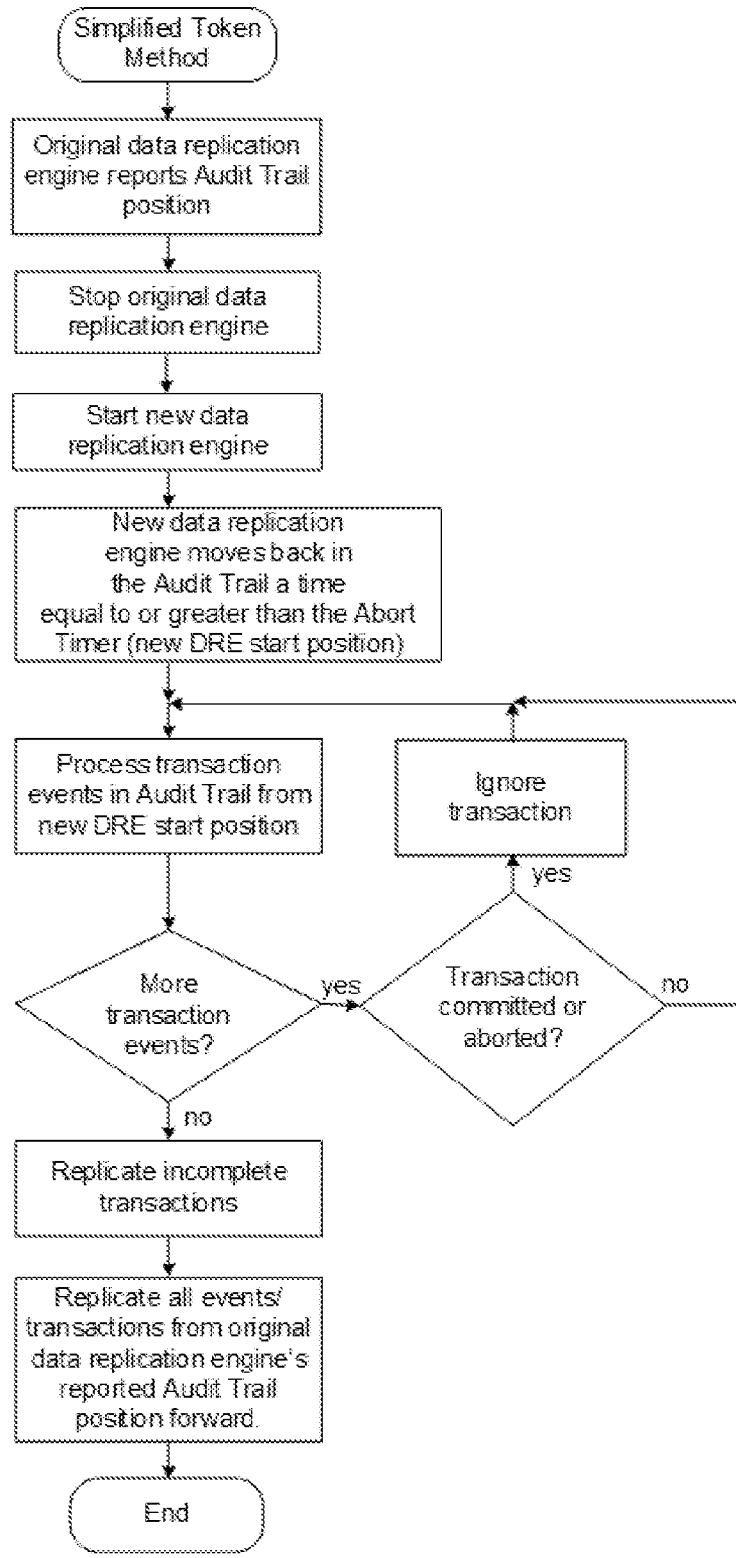
Figure 15: Simplified Token Method Flow Chart

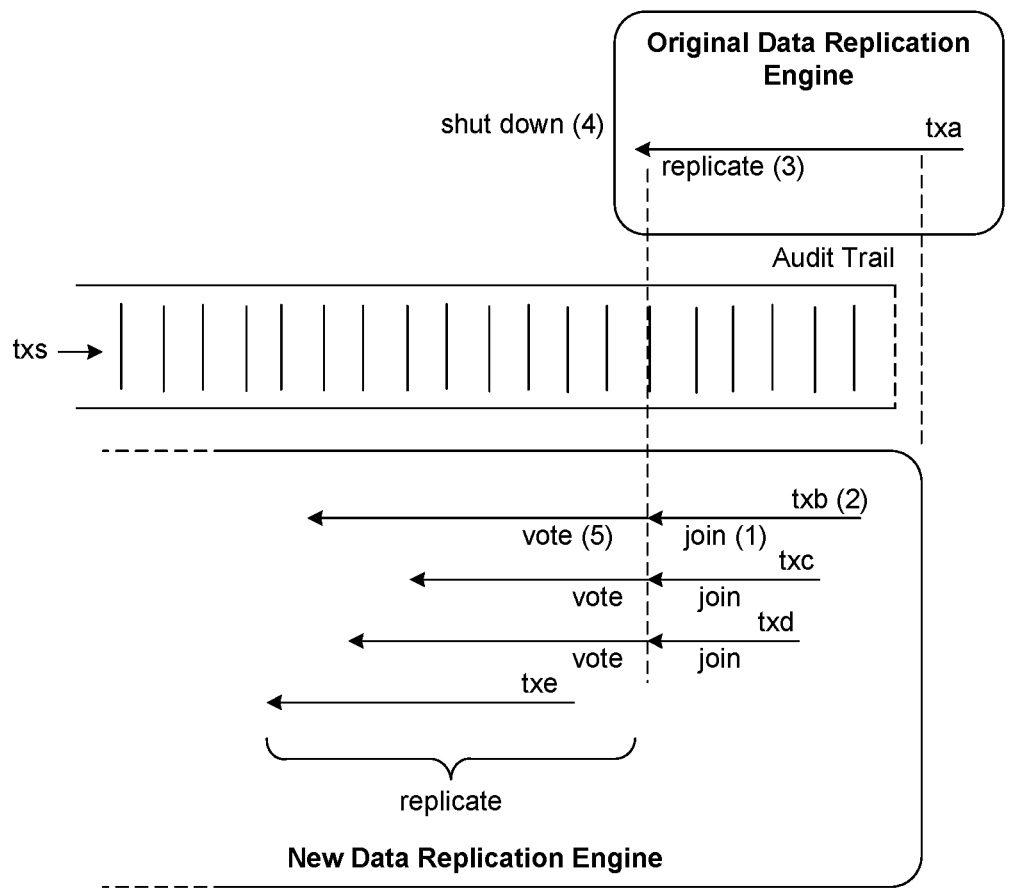
txa – started before the new data replication engine is started.
txb, txc, tcd – started before the original data replication engine is shut down and continue after it is shut down.
txe – started after the original data replication engine is shut down.
Figure 16: Changing a Data Replication Engine - Join Method

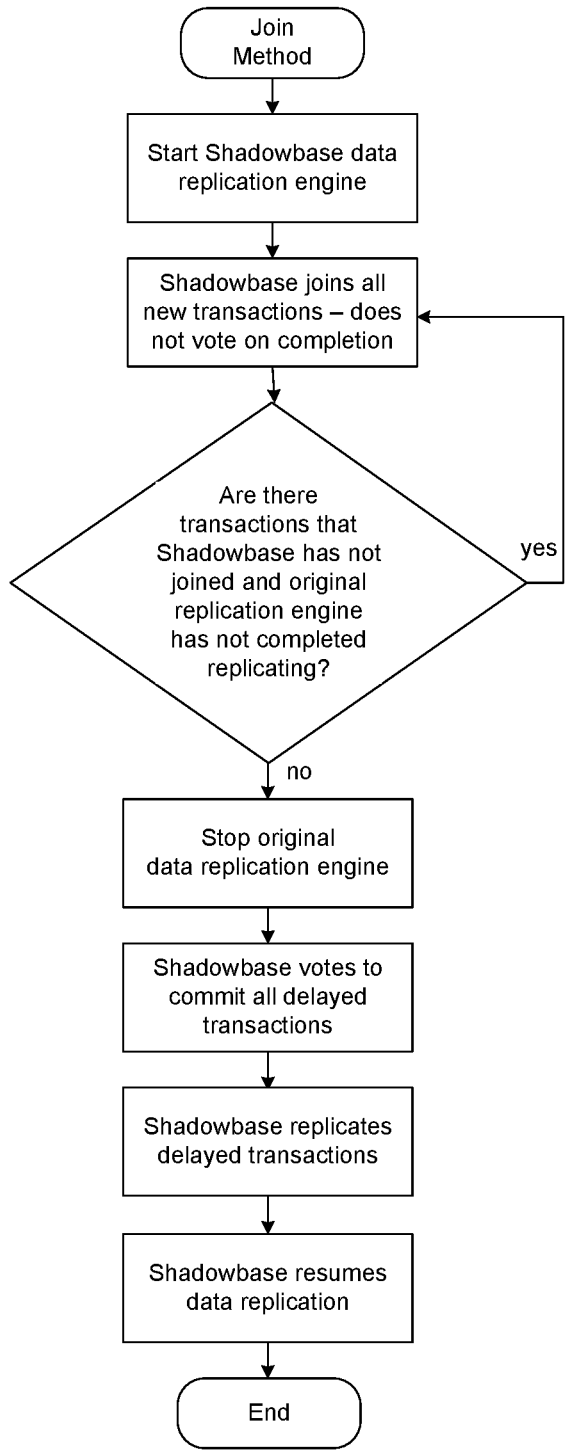
Figure 17: Join Method Flow Chart

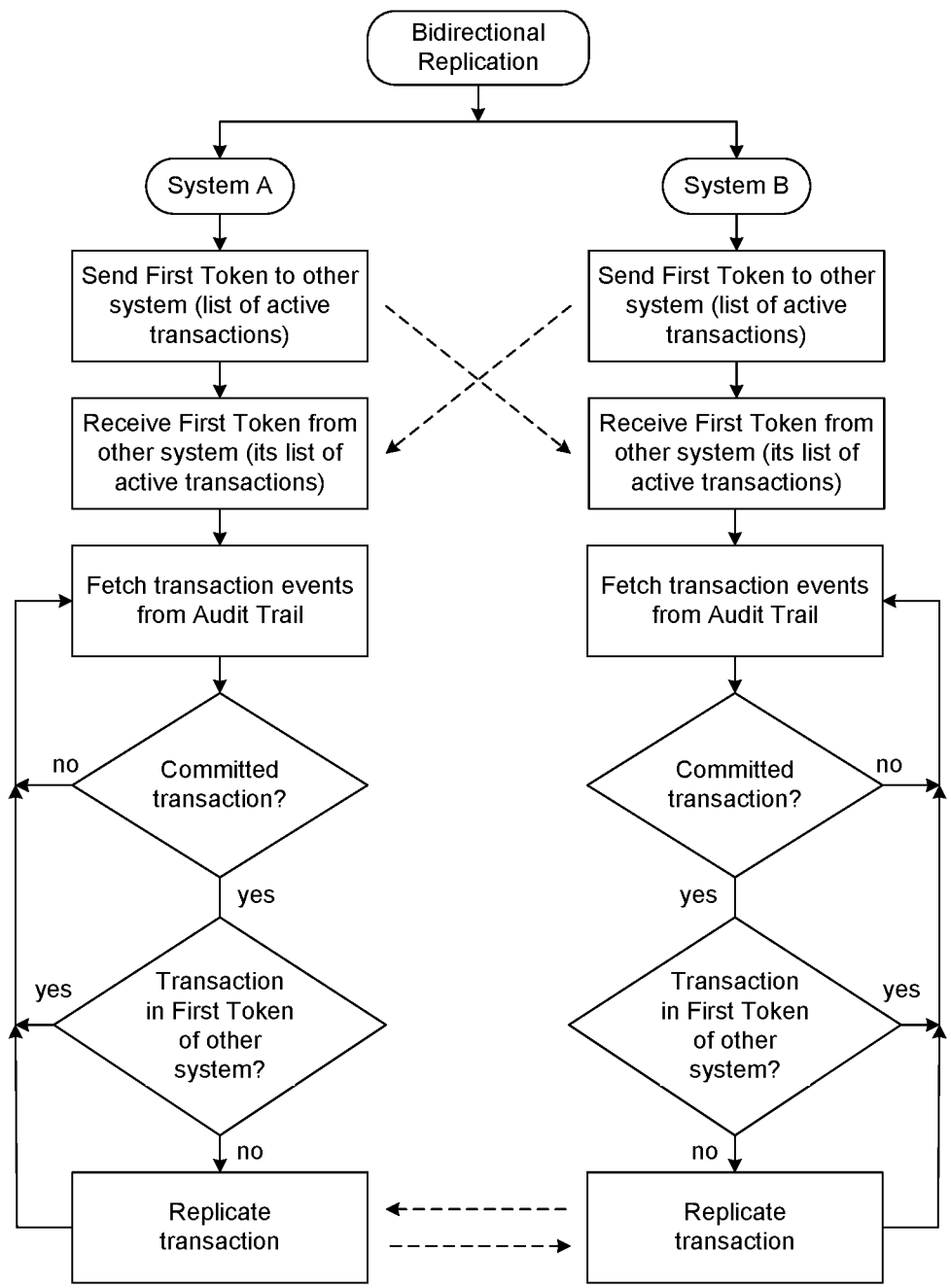
Figure 18: Avoiding Data Oscillation

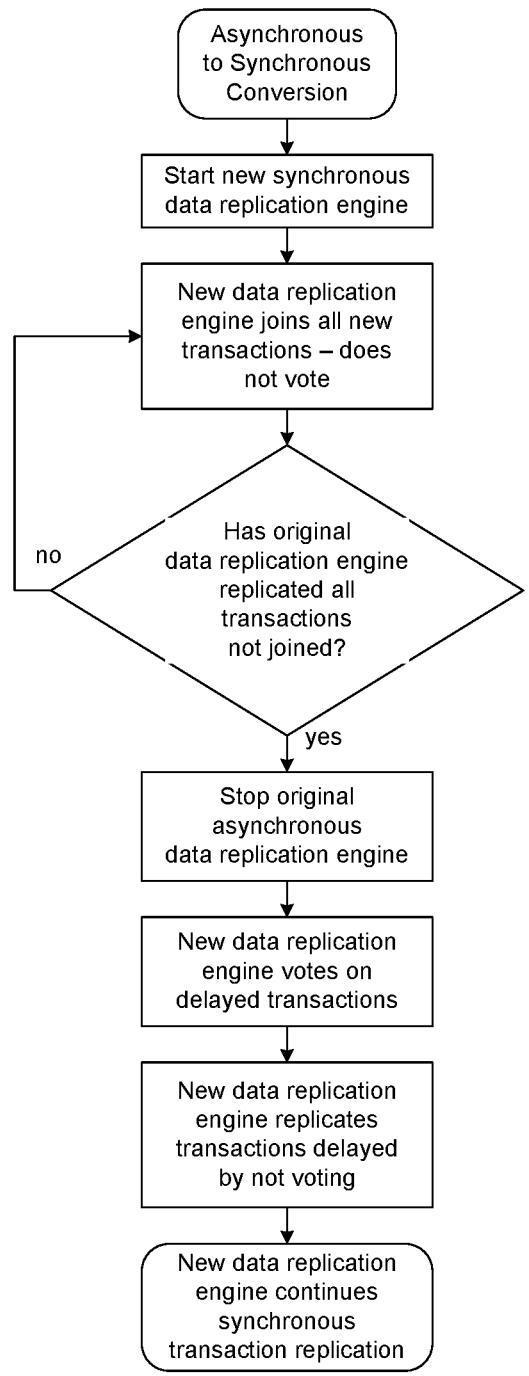
Figure 19: Asynchronous to Synchronous Data Replication Upgrade – Method 1

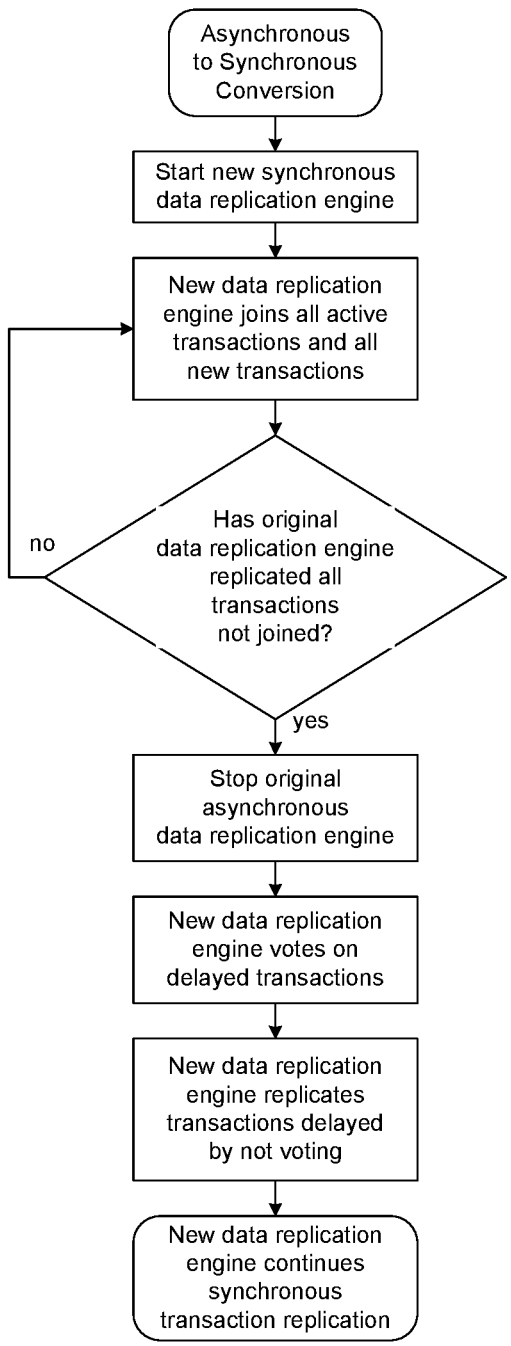
Figure 20: Asynchronous to Synchronous Data Replication Upgrade – Method 2

METHOD FOR REPLACING A CURRENTLY OPERATING DATA REPLICATION ENGINE WITH A NEW DATA REPLICATION ENGINE WITHOUT APPLICATION DOWNTIME AND WHILE PRESERVING TARGET DATABASE CONSISTENCY

CROSS-REFERENCE TO RELATED APPLICATIONS

This application is a continuation-in-part of U.S. patent application Ser. No. 15/838,991 filed Dec. 12, 2017, which is incorporated herein by reference.

This application claims priority to U.S. Provisional Patent Application No. 62/436,581 filed Dec. 20, 2016, which is incorporated herein by reference.

BACKGROUND OF THE INVENTION

1 Background

Certain terms used in the "Background of the Invention" are defined in Section 6, "Definitions."

1.1 Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as a computer program (1) running in a computer (2). A computer program is basically a set of computer-encoded instructions. It often is called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each depicting an entity-set member such as an employee. A table comprises rows that define members of an entity set. A record comprises fields that describe entity-set attributes, such as salary. A row comprises columns that depict attributes of the entity set. In this specification, "files" are equivalent to "tables;" "records" are equivalent to "rows;" and "fields" are equivalent to "columns."

1.3 Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming request. For instance, a computer application may on its own generate random events for testing other applications.

1.4 Request Processing

As shown in FIG. 1, the application receives a request from an incoming end user (5). As part of the processing of this request, the application may make certain modifications to its database (6).

The application can read the contents of its database (7). As part of the application's processing, it may read certain information from its database to make decisions. Based on the request received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report upon a request from an end user or a report that is generated periodically.

Alternatively, the application program may spontaneously deliver a service, either on a timed basis or when certain conditions occur. For instance, an alarm may be generated to operations staff if the load being carried by an electric-power transmission line exceeds a specified threshold.

The end users providing the input to the application may or may not be the same end users as those that receive its services.

1.6 Availability

The availability of a computer system and the services it provides is often of paramount importance. For instance, a computer system that routes payment-card transactions for authorization to the banks that issued the payment cards must always be operational. Should the computer system fail, credit cards and debit cards cannot be authorized, usually resulting in all credit charges being rejected. Customers can only engage in cash transactions until the system is repaired and is returned to service.

The failure of a 911 system could result in the destruction of property or the loss of life. The failure of an air-traffic control system could ground all flights in a wide area.

In mission-critical systems such as these, it is common to deploy two or more computer systems for reliability. Should one computer system fail, the other computer system is available to carry on the provision of services.

1.7 Redundant Systems 1.7.1 Active/Backup and Active/Active Systems

The availability of a computing system can be significantly enhanced by providing a second system that can continue to provide services to the end users should one system fail. The two systems can be configured as an active/backup system, as an active/active system, or as a hybrid system whereby some applications are configured using one approach and some the other approach. The systems are interconnected via a computer network so they can interact with each other.

In an active/backup system (or architecture, FIG. 2), one system (the production system) is typically processing all transactions that update the database. It is keeping its backup system synchronized by sending, via data replication, the active system's database changes to it so that the backup system is ready to immediately take over processing should the production system fail.

In an active/active system or architecture (FIG. 3), both systems are processing transactions. They keep each other synchronized via bidirectional data replication. When one system processes a transaction and makes changes to its database, it immediately replicates those changes to the other system's database. In that way, a transaction can be routed to either system and be processed identically. Should one system fail, all further transactions are routed to the surviving system.

An additional architecture that improves on the availability of the active/backup architecture but does not quite attain the same availability as the active/active architecture is called a Sizzling-Hot-Takeover (SZT) architecture and is shown in FIG. 4. It is effectively an active/active architecture in which transactions are sent to only one of the two systems. This allows applications that cannot run in a distributed environment to still be afforded the availability of an active/active system.

In a hybrid system, the system architects design each application's availability architecture to match the business needs of that specific application.

1.7.2 Data Replication

Data replication is the process that maintains the database on one environment (such as a target system) synchronized with a database on another environment (such as a source system). As described above with respect to FIG. 2, the database of the backup system in an active/backup redundant system is kept synchronized with the active system via unidirectional data replication. Likewise, as described above with respect to FIG. 3 and FIG. 4 each database in an active/active or SZT system is kept synchronized with the other database via bidirectional data replication.

There are several types of approaches that can be used for data replication. These approaches include, for example, a source-database log-reading data replication engine, a source database trigger-based data replication engine, and middleware optionally with adapters as the messaging interconnect. The actual approach used to implement the data replication engine is prior art as described in Section 2, "Examples of Data Replication Engines."

There are two fundamental types of data replication—synchronous replication and asynchronous replication. With synchronous replication, any change to the source database can only be made if it can be guaranteed that the same change will not be lost and either will be immediately or eventually applied to the target database. Therefore, the source and target databases will always be exactly synchronized.

With asynchronous replication, changes to the target database are made after they have been made to the source database and are not guaranteed to survive catastrophic source system loss or other failures that may lose them. Therefore, the target database lags the source database by a small interval of time (often as small as subseconds). This lag is called "replication latency".

Asynchronous replication is usually implemented via a data replication engine (though in some cases, the application performs this function). In order for an asynchronous data replication engine to access changes that have been made to a source database and transfer them to a target database, it must have a queue of changes that it can follow. As each change is made to the source database, that change is entered into the change queue. This is usually accomplished by a database management system (DBMS). The data replication engine can then read each change from the change queue and transmit it to the target system, where it is applied to the target database.

1.7.3 The Audit Trail

In many systems, such as HPE NonStop systems, changes made to the source database are inserted into the change queue automatically by a transaction manager. In NonStop systems, the transaction manager is NonStop TMF (Transaction Management Facility). The change queue into which TMF enters each change to the source database is called the Audit Trail. The changes that are inserted into the Audit Trail include a "before image" copy of the data (e.g., for a delete operation), an "after image" copy of the data (e.g. an insert operation), or both (e.g., an update operation that includes a copy of the data before it was changed as well as a copy of the data after it was changed). Hereinafter, the change queue may also be referred to as the Audit Trail in this disclosure, regardless of the environment in which it resides. During recovery from an outage, committed transactions are rolled forward from events stored in the Audit Trail (using the after images); and aborted transactions are rolled back from events in the Audit Trail (using the before images).

The Audit Trail typically records all events from both committed and aborted transactions. For instance, consider the two transactions tx1 and tx2, shown in Table 1, that are executing simultaneously ("I" is insert, "U" is update, "D" is delete):

TABLE 1

| Transactions tx1, tx2 | |
|---|---|
| tx1 | tx2 |
| I1 | D2 |
| U1 | U2 (x → y) |
| Commit1 | Abort2 |
| | Undo U2 (y → x) |
| | Undo D2 |
| | AbortEnd2 |

One example of the events of Table 1 as they may be stored in the Audit Trail is shown in FIG. 5. The sequence of events shown in the Audit Trail in FIG. 5 follows the sequence of events generated by tx1 and tx2 in Table 1. Note that the events shown may be actual events or implicit events. For example, the "Abort2" event identifies when the abort happened and may not physically appear in the Audit Trail.

The Audit Trail is used by some of the data replication engines described below as a source of changes to replicate to the target database.

2 Examples of Data Replication Engines

In HPE NonStop systems, there are several data replication engines available for use. Examples of these are described in the following sections.

2.1 HPE Remote Database Facility (RDF)

NonStop RDF (Remote Database Facility) is a product of Hewlett-Packard Enterprises (HPE) located in Palo Alto, Calif., U.S.A. RDF uses the contents of the Audit Trail to replicate changes from the source database to the target database. RDF never aborts; it only commits (aborts are implemented as commits of the Undo events for the aborted transaction).

During transaction replication and replay, RDF essentially ignores the transaction delimiters in the Audit Trail (Abort2, Cmt1, AbortEnd2, as shown in FIG. 6). Rather, as it is sending changes from the Audit Trail to the target database, it commits the changes to the target database after every N events, regardless of whether the source transaction events were eventually committed or aborted. Therefore, the target database can be significantly inconsistent during the replay. For an aborted transaction, the Undo events reverse the Do events of the transaction as RDF replays the Audit Trail at the target system. In addition, the events for incomplete source transactions are applied to the target database and materialize to the target applications when RDF periodically calls commit (that is, they are eventually committed and unlocked by RDF) if they have not been backed out by RDF.

RDF essentially has two modes that can be invoked if RDF is paused (or stopped). One mode, called a "soft stop" in this disclosure, attempts to create a consistent target database when the soft stop operation occurs. At the point RDF is paused, a "soft stop" will leave untouched all source transactions that RDF has fully replayed at the target. This includes all source transactions that committed (and that RDF has committed) as well as all source transactions that aborted (and for which RDF has replayed all of the UNDO events thru to the final abort event, which was discarded and replaced with a subsequent commit performed by RDF).

However, all incomplete transactions will be backed out at the target. Incomplete transactions are source transactions that are in an unknown state at the point RDF was paused (i.e. RDF does not know whether that source transaction will commit or abort). Incomplete transactions are rolled back by RDF on the target database. Likewise, any aborted source transactions for which RDF was in the middle of replaying UNDO events, but for which RDF had not yet seen or processed the final abort events (as a commit) will be rolled back by RDF on the target database.

The effort to make the target database consistent at the end of a soft stop operation takes time. In most cases, RDF has to find the appropriate events for the incomplete transactions in the target database's audit trail and roll them back by applying the before images of those events. During this process, the target database is unavailable for application processing since the database is inconsistent and is locked against application change access. Since this is also the sequence RDF performs when a failover to the target database occurs, the "failover delay" that occurs before the application can be started on the target environment is much longer with RDF than with the other data replication engines discussed below.

The second RDF mode (called a "hard stop" in this disclosure) leaves the target database in an inconsistent state if RDF is paused. All transactions that had ended and had been applied by RDF before the point the hard stop was issued are completed and left as is in the target database. For all other transactions, the events that preceded the pause command are applied and committed at the target, regardless of whether or not any of those transactions will eventually abort after the pause command.

In summary, for standard operation, RDF never aborts transactions. It always commits them (if the RDF processes fail, for example due to a cpu failure, the system may abort and backout the RDF transaction, but this is not RDF processing, it is standard TMF processing to resolve incomplete transactions for a failed process). RDF can be terminated via a "soft stop" or a "hard stop." If RDF is terminated via a soft stop, it backs out all incomplete transactions on the target database, leaving it in a consistent state. If RDF is terminated via a hard stop, it leaves incompleted transactions in the target database, leaving the target database in an inconsistent state.

If RDF is terminated via a hard stop, to eventually make the target database consistent, all events for transactions that were active at the time of the termination must be replayed even if they had been aborted. The following table illustrates how this technique will remove aborted transactions. When the transaction is begun, RDF will apply transaction events to the target database. If the transaction is aborted, RDF will ignore the Abort event but will apply the Undo events to the target database. It will then commit the Undo events that it has just replicated.

| Application Tx | RDF |
| --- | --- |
| Begin Tx | |
| I/O | Applies at target |
| Abort | Ignore |
| Undo I/O | Applies at target |
| AbortEnd | Commit (at a later time) |

2.2 Oracle GoldenGate

The Oracle GoldenGate data replication engine (referred to as "GoldenGate" below) is a product of Oracle Corporation, located in Redwood Shores, Calif., U.S.A. GoldenGate creates and maintains its own transaction log as shown in FIG. 7. As the application executes transactions, GoldenGate extracts the events of the transactions and stores them in memory. When a transaction completes, GoldenGate stores the transaction in its memory-resident transaction log. Should a transaction abort, it is deleted from memory or is otherwise marked to be skipped and not processed. Thus, the GoldenGate transaction log stores completed transactions in committed order.

The transaction log represents a queue stored on the source system of all committed transactions. Transactions are replicated from the transaction log to the target database by GoldenGate, where they are replayed to the target database in that same order.

As an option, transactions replicated to the target database may be queued on the target system before they are applied to the target database. This architecture provides some additional recovery capability should the source system or the interconnecting network fail, since it is faster for transactions received at the target system to be stored in a queue than it is for the transactions to be applied to the target database. Therefore, the source system can replicate transactions to the target system even if the target side cannot apply them as fast as they are being received, minimizing the amount of queue time that they must spend in the source system.

With GoldenGate, the target system is always in a consistent state since only those transactions that have been committed on the source system are replayed to the target system and applied to the target database.

GoldenGate will not replay any transactions whose commit events it has not yet encountered.

2.3 Shadowbase®

The Shadowbase data replication engine from Gravic, Inc., of Malvern, Pa., U.S.A., replicates events from the Audit Trail (FIG. 8). However, unlike RDF, the Shadowbase data replication engine recognizes Begin Transaction, Commit Transaction, and Abort Transaction events in the Audit Trail.

As the Shadowbase data replication engine extracts each event from the Audit Trail, it replicates it to the target system and applies it to the target database. When the Shadowbase data replication engine recognizes a Begin Transaction event (either because of an explicit Begin Transaction event in the Audit Trail or because of the first event for a new transaction), it begins an independent transaction on the target system. As events for that transaction are extracted from the Audit Trail, they are replicated to the target system and applied to the target database under the target system's transaction. If a Commit Transaction event is extracted from the Audit Trail for that transaction, the corresponding target system's transaction is committed to the target database. If an Abort Transaction event is extracted for that transaction from the Audit Trail, the corresponding target system's transaction is aborted on the target system.

The Shadowbase data replication engine replicates and applies many intermixed transactions at a time. The transaction mix being replicated to the target system is the same mix of transactions that are (or were previously) being processed by the source system, as represented by the events in the source audit trail. This is different than GoldenGate, which replicates and applies the events for only one source (committed) transaction at a time. Shadowbase is also different than RDF, since Shadowbase replicates transactions while RDF replicates transaction events with no consideration of the transaction boundaries (unless a soft stop occurs).

If Shadowbase is shut down in the middle of processing transactions, it will commit any transaction for which it has received a commit event. It will abort any transaction for which it has received an abort event, and it will abort any transaction for which it has not yet received a commit or abort event. For a subsequent restart, Shadowbase maintains a pointer back into the audit trail where it will restart and pick up the data for those transactions that did not complete before it was shutdown, thus replaying the partially applied transactions that it had aborted at the time it was shut down.

3 Changing a Data Replication Engine

On occasion, it may be desirable to change from one data replication engine (or data replication engine version) to another data replication engine (or data replication engine version). For instance, the system may currently be using RDF to keep a backup database synchronized with the active database in an active/backup configuration. However, it may be desired to upgrade the active/backup system to an active/active system for improved reliability and availability.

An active/active system requires bidirectional replication. Whenever a change is made to one of the databases in the system, that change must be replicated to the other system; and vice versa. RDF is not capable of bidirectional replication. Therefore, the data replication engine must be changed to one that will support bidirectional replication. The Shadowbase data replication engine supports bidirectional replication. Consequently, a means must be provided in this case to replace the RDF data replication engine with the Shadowbase data replication engine while eliminating any disruption to the application.

In the current art, a primary way to change a data replication engine while preserving target database consistency is to quiesce the application, letting it complete any transactions in process but not allowing it to begin any new transactions. When the data replication engine has completed replicating these transactions to the target system, the data replication engine can be shut down (FIG. 9). This point will typically be the Audit Trail end-of-file, or another specific Audit Trail position. This provides a clean and consistent point for replacing the original data replication engine and starting the new data replication engine from a transaction perspective. In other words, the original data replication engine is responsible for replicating and applying all database changes prior to the quiesce point, and the new data replication engine is responsible for replicating and applying all database changes after the quiesce point.

Once the quiesce point is selected and implemented, the new data replication engine can be installed (if not already) and started (if not already). It will open the Audit Trail and position itself at the Audit Trail's end-of-file or the quiesce position from above. However, the application has suffered an outage (i.e., application change-data services are unavailable) during the time that it takes to change the data replication engine. And, even if this could be accomplished without stopping the application from servicing requests, the data replication engine is stopped (or at least is not replicating) during the switchover process, and hence increasing the potential for data loss should the source environment fail at this time.

4 What is Needed

Many applications are mission-critical and cannot be shut down without causing significant problems for a company. What is needed is a method to replace or upgrade a data replication engine while the application continues to function and is generating transactions. Additionally, when the switchover takes place, what is needed is for the new data replication engine to not lose or skip any of the data that was not replicated by the original data replication engine and to not replay any data that was already replicated and applied by the original data replication engine. The source data should not remain on the source environment too long before it gets replicated while the switchover takes place, and the target database should remain consistent while the switchover takes place.

BRIEF SUMMARY OF THE INVENTION

5 Brief Summary

The purpose of the current invention is to provide a method to replace or upgrade a data replication engine while the application continues to run, generating transactions, thereby avoiding an application outage. Also, an additional set of purposes of the current invention is to replace the original (or old) data replication engine without losing or replaying any transactions (e.g., achieving an RPO of zero or as close to zero as possible during the switchover), and to keep the target database in a consistent state while the original data replication engine is being replaced.

Additionally, the switchover process should not leave the data that is generated while the switchover takes place sitting on the source system for longer than it usually takes to replicate it, as that can lead to substantial data loss (and cost) should the source system fail while the switchover takes place. The amount of data loss that is tolerable is called the Recovery Point Objective (RPO). It is a further goal of the present invention to ensure that there is no data loss (an RPO of zero) or that potential data loss is minimized when switching data replication engines.

The preferred embodiment to accomplish this is to write a first token (call this position 1) into the Audit Trail while both the application and the original data replication engine remain actively creating and replicating transactions. The first token includes a list of all transactions that are currently in progress when the token is created and written into the Audit Trail. When all these transactions have been subsequently completed (committed or aborted)—call this position 2—the original data replication engine can be stopped and the new data replication engine can be started. All of the events represented from the first position 1 to the second position 2 are contained in the "position window", i.e., the window of events (or time) from the first position to the second position. Note that the original data replication engine is responsible for replicating all of the transactions identified in the first token.

The new data replication engine begins reading the Audit Trail at the first token (position 1) and skips the data for any transactions listed in that token since the original data replication engine has already replicated them. Any new transactions that are not in the first token that begin at or after position 1 and end (commit or abort event in the audit trail) before position 2 is reached can also be discarded as the original data replication engine has already replicated them as well. For any other transactions that started after the first token but did not complete before the second position, the new data replication engine will replicate those to the target and apply them. Hence, once the original data replication engine is stopped, the rules can be summarized as follows for each event/transaction in the position window:

- The new data replication engine begins reading the audit trail at position one (where the first token is).
- Each transaction listed in the first token is skipped and not replicated by the new data replication engine (because the original data replication engine already replicated it).
- Each new transaction that starts after position 1 and ends before position 2 is also skipped (because the original data replication engine already replicated it).
- Each new transaction that starts after position 1 but does not end before position 2 is replicated by the new data replication engine.
- Each transaction after position 2 is also replicated by the new data replication engine.

In some cases, it will not be easy to stop the original data replication engine exactly at position 2, and hence position 2 might become either the original data replication engine's "reported stopping point", assuming it reports this position (the position it took responsibility for replicating all completed transactions prior to this point), or a second token can be inserted into the audit trail, immediately pausing the original data replication engine at that point.

Note that it is the responsibility of the original data replication engine to replicate all transactions that completed prior to the position 2 location in the audit trail. If a particular data replication engine does not meet this criteria, the algorithm can be adjusted to, for example, also replicate the transactions that are listed in the first token, or to replicate the transactions that are created after the first token or complete before the second position, etc.

6 Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A processor with memory and input/output devices that can execute a program.

Computer—A system.

Node—A computer that is one of two or more nodes making up a redundant system.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Active/Backup System—A system architecture in which an active production system is backed up by a passive system that may be doing other work. The database of the passive system is kept synchronized with the active system via data replication. Should the active system fail, the backup system is brought into service; and the application continues running on the backup system. Failover from a failed active system to the backup system can take some time, ranging from minutes to hours. Furthermore, the failover may not work (a failover fault).

Active/Active System—A system architecture in which two or more computing systems are actively processing transactions for the same application. The databases of the two systems are kept synchronized with each other via bidirectional data replication. Should one system fail, recovery only entails sending further transactions to the surviving system(s). Failover typically can be accomplished in seconds, and there are no failover faults (the surviving systems are known to be working).

Sizzling-Hot Takeover (SZT) system—An active/active architecture in which only one computing system is processing transactions. An SZT system avoids the problems that an application might face if run in a distributed environment, but it has the fast and reliable failover characteristics of an active/active system.

Data Replication—Transferring changes made to a source database to a target database to keep the target database synchronized with the source database.

Asynchronous Data Replication—A data-replication technique in which changes to the target database are made after the changes have been made to the source database. The contents of the target database lag the contents of the source database by a short time interval.

Synchronous Data Replication—A data-replication technique in which a change to the source database is made only after it is guaranteed that the same change will be applied to the target database. The contents of the source database and target database are always in the same state.

Data Replication Engine—A facility for providing asynchronous or synchronous replication.

Replication Latency—The delay from when a change is made to the source database to when it is made to the target database when using asynchronous replication.

Change Queue—A queue of all changes made to a source database. The Change Queue is often ordered by the order that the changes occurred in, or the ascending time associated with when each change was made. The Change Queue is often used as a source of changes for an asynchronous data replication engine. Typically, the changes in the change queue have an associated time recorded with each change that reflects the time that the change occurred in the source database. Hence, a "position window" into the audit trail refers to all changes from a first change to a second change (inclusive), or from a first time to a second time, whereby the position window contains all of the changes that occur from the first change to the second change, or from the first time to the second time. The position window is reflective or representative of an amount of the audit trail that will typically get additional or special processing applied to it depending upon the algorithm being implemented.

Audit Trail—A Change Queue.

Change Log—A Change Queue.

Source System—The system from which data is being replicated.

Source Database—The database on the source system.

Target System—The system to which data is being replicated.

Target Database—The database on the target system.

Consistency—Agreement of parts to one another as a whole.

Data Consistency—Any given database transaction must change data only in allowed ways. Any data written to the database must be valid according to all defined rules.

Target Database Consistency—The data contained in the target database is left consistent following any transaction applied to the database.

Abort Timer—Represents the longest duration that a transaction can exist before the DBMS or system automatically aborts or removes it. It is often based on the time duration of the transaction (e.g., automatically abort all transactions that span two hours), but it can also be based on other transaction attributes such as the quantity of data that has been updated by the transaction (e.g., automatically abort all transactions that have changed more than 1,000,000 rows or created more than 2,000,000 bytes of Audit Trail data). It can even be based on attributes such as how much space in the Audit Trail the transaction's events span (e.g., automatically abort all transactions that span more than 10 Audit Trail files).

TIDFILE—A "TIDFILE" is a file or table or other persistent data structure that saves the transaction id's of transactions that a data replication engine has replicated and applied into a target database. It is typically used to support a restart operation whereby the data replication engine may use the TIDFILE information to identify transactions that it already applied into a target database. For example if, during a restart, the data replication engine re-receives one or more blocks of transactions that it already applied into the target database, it can use the TIDFILE to check for the incoming block's transaction id's, and if present in the TIDFILE, it has already applied those transactions so it can skip those that are present in the TIDFILE. The TIDFILE is typically maintained by inserting the transaction id's of the incoming transactions into the TIDFILE as part of each incoming transaction being replayed (that way it is persistent if the transaction commits, and will be backed out if the transaction aborts for any reason, including system failure).

TRACKTXFILE—a TRACKTXFILE serves a similar purpose to the TIDFILE. It is used by the data replication engine to determine if an incoming transaction has already been replayed at the target database. It uses a different algorithm than the TIDFILE does, namely to track the incoming transaction's commit location/timestamp, and if an incoming transaction's commit location or timestamp precedes the commit locations/timestamps in the TRACKTXFILE, the data replication engine can assume that transaction was already replayed at the target database because commits are typically replayed in location or timestamp order at the target.

BRIEF DESCRIPTION OF DRAWINGS

7 Drawings

FIG. 1 shows a prior-art computer application.

FIG. 2 shows a prior-art active/backup system.

FIG. 3 shows a prior-art active/active system.

FIG. 4 shows a prior-art sizzling-hot takeover system.

FIG. 5 shows a prior-art Audit Trail containing two transactions.

FIG. 6 shows the prior-art processing of an Audit Trail by an HPE RDF data replication engine.

FIG. 7 shows the prior-art processing of a Transaction Log by an Oracle GoldenGate data replication engine.

FIG. 8 shows the prior-art processing of an Audit Trail by a Gravic Shadowbase data replication engine.

FIG. 9 shows the prior-art method for changing data replication engines

FIG. 10 shows the Brute Force method for changing a data replication engine without stopping the application.

FIG. 11 shows a flow chart for the Brute Force method.

FIG. 12 shows the Token method for changing a data replication engine without stopping the application.

FIG. 13 shows a flow chart for the Token method.

FIG. 14 shows the Simplified Token Method for changing a data replication engine.

FIG. 15 shows a flow chart for the Simplified Token Method.

FIG. 16 shows the Join method for changing a data replication engine.

FIG. 17 shows a flow chart for the Join method.

FIG. 18 shows a flow chart for avoiding data oscillations.

FIG. 19 shows a flow chart depicting one method for upgrading an asynchronous data replication engine to a synchronous data replication engine.

FIG. 20 shows a flow chart depicting an alternate method for upgrading an asynchronous data replication engine to a synchronous data replication engine.

DETAILED DESCRIPTION OF THE INVENTION

8 Detailed Description

Certain terminology is used herein for convenience only and is not to be taken as a limitation on the present invention.

The words "a" and "an", as used in the claims and in the corresponding portions of the specification, mean "at least one."

This disclosure describes several methods that can be used to replace a data replication engine while the application continues to run. One method is the "Brute Force" method. Another method is the "Token" method. A third method is the "Join" method. Other alternative methods are also described.

In the descriptions which follow, the term "Audit Trail" implies the Audit Trail for the RDF and Shadowbase data replication engines. It implies the Transaction Log for the GoldenGate data replication engine. However, it is also meant to cover other forms of a change log.

In the descriptions which follow, some of the algorithms describe a go-back interval or position. In general, this is a position (physical or virtual) in the audit trail where audit trail reading will commence when the algorithm executes and the new data replication engine takes over. The algorithm will typically require a minimum go-back (or reposition) interval to ensure that no data is skipped or lost when switching the data replication engines. Typically, the new data replication engine can go back even farther in the audit trail than the minimum go-back interval as replaying data from that farther point forward will only apply (overlay) transaction data on the target that was already replayed, resulting in a brief data inconsistency at the target until the new data replication engine catches up to where the data had not been replayed yet. Additionally, if this brief inconsistency window should be avoided, the new data replication engine can avoid it by using a TIDFILE or TRACKTXFILE that the old data replication engine maintained to identify transactions that had already been replayed, and skipping them if so.

In some cases, the go-back position selected may be less than the minimum described above. If this approach is selected, it means that some of the data for transactions that were in process (not completed) at the time of the switchover may not be replicated to the target database. For some applications, this type of data loss is unacceptable (for example, many financial applications), and they will choose to go back at least as far as is described above. For those applications that can allow data loss, they can choose a go-back interval that is not as far as described above, and in the extreme case, they can just pick up replicating with the new replication engine from the old replication engine's reported shutdown point forward. For instance, many telco applications are not concerned about short bursts of data loss; they are more concerned with uptime.

8.1 Brute Force Method

FIG. 10 shows the Brute Force method for changing a data replication engine without stopping the application. FIG. 11 shows a flow chart for the Brute Force method. When using the Brute Force method, the original data replication engine is quiesced; and the new data replication engine is installed and started (if not already).

In some cases, it is possible that certain transactions may not have completed when the original data replication engine is quiesced. If there are transactions still in flight, the new data replication engine will have to go back far enough in the Audit Trail to find the start of these transactions and to follow them up to the current time so that both the old and the new events for these transactions can be replicated. The maximum time that the data replication engine must go back is typically the time established by the transaction Abort Timer, although going back further back is also possible as replaying data that was already replayed will overlay the target with the same information. Any transaction that has taken longer than the Abort Timer timeout will be automatically aborted by the DBMS or system. Any transactions that have committed during this time (from the Abort Timer thru the quiesce time) should not be re-replicated as they were already replicated and applied by the original data replication engine.

The timestamp or other identifier of the last entry in the Audit Trail that was replicated (or processed by the original data replication engine) is noted (1). The new data replication engine then goes back in the Audit Trail by a time equal to or greater than the Abort Timer timeout (2) (any transactions that were still in progress from before the Abort Timer timeout will have been aborted). The data replication engine can read the Audit Trail in reverse until it reaches (or reads beyond) the Abort Timer, or it can position back to the Abort Timer (or beyond the abort timer) and read the Audit Trail forward to the timestamp or audit trail position that represents the point in time the data replication engines were changed.

The data replication engine follows the transactions in the Audit Trail from the position selected above to the event in the Audit Trail that was the last event entered before the original data replication engine was shut down (via its timestamp or audit trail position). While doing so, it builds a list of transactions (for performance reasons, this may be done in its memory). Should a transaction commit or abort (3, 4), it is deleted from the list.

When the Audit-Trail timestamp or position is reached, any transactions still in memory (5, 6) are transactions in progress, and further events for these transactions (such as their commit or abort event) will be found in the Audit Trail later on. Such events will be replicated to the target database (7). When a transaction is committed, the data replication engine will commit it on the target database (8). Should a transaction be aborted, the Undo events will be replicated to the target database and committed.

Transactions that started after the data replication engines were changed (9) are replicated by the new data replication engine.

Hence, when the new data replication engine takes over, there may be a brief period of target database inconsistency for the transactions that were in progress at the point of the switchover, assuming these transactions had events that were replayed and hence are partially committed transactions. All new transactions encountered in the Audit Trail from the timestamp or position forward are replayed as complete transactions, thereby preserving target database consistency from that point forward.

Furthermore, the replication of transaction events is somewhat delayed while the Brute Force method searches the Audit Trail for transactions in progress. This delay extends the amount of data that might be lost if the source system should fail.

8.2 Token Method

FIG. 12 shows the Token method for changing a data replication engine without stopping the application. FIG. 13 shows a flow chart for the token method. When using the token method, the original data replication engine writes a first token into the Audit Trail containing a list of all transactions (1) that were active when the first token was written. Note that the first token position can be virtual or a physical event inserted into the Audit Trail.

The list of transactions in the first token could be determined in several ways. For example:
- The data replication engine itself may have a list of all active transactions (for instance, it may have registered for them).
- The DBMS or Transaction Management Facility (TMF) could be queried to get the list of active transactions.
- Alternatively, the data replication engine could search the Audit Trail from the current time stamp back to or past the Abort Timer time (or from at or before the Abort Timer time to the current timestamp) to determine all active transactions.

When all of the transactions in the first token have completed (committed or aborted), the original data replication engine is quiesced. If the original data replication engine can be stopped immediately, either it or the new data replication engine notes the timestamp or Audit Trail position showing where the original data replication engine had terminated. If the original data replication engine cannot be stopped immediately (i.e., control of the original data replication engine is asynchronous), the new data replication engine notes the timestamp or writes a second token (again, this token can be physical or virtual) to the Audit Trail (2) indicating that all of the transactions in the first token have completed. At this point, the original data replication engine is quiesced (3).

The new data replication engine is then started (4) and begins processing the Audit Trail from the first token. Alternatively, the new data replication engine can be started as soon as the position of the first token is known. This alternative reduces RPO since the Audit Trail is being read by the new data replication engine as soon the original data replication engine has indicated via the first token which transactions it is responsible for.

The new data replication engine ignores any events for transactions listed in the first token since it is known that these transactions have completed (before the second token is reached, if one was written—transaction txa in FIG. 12) (5). When the new data replication engine finds events for transactions not listed in the first token, it ignores completed transactions (transaction txb in FIG. 12) (6) until it reaches the first data replication engine's terminating time stamp or the (optional) second token. However, transactions that have not completed by the time the time stamp or second token is reached (transaction txc in FIG. 12) (7) will have been backed out by RDF (or not replicated by GoldenGate, which replicates only complete transactions). The new data replication engine must replicate these transactions in their entirety (8) (9).

Transactions that started after the second token or its virtual position (10) are replicated by the new data replication engine.

In the above paragraph, we noted that transactions that had not completed by the time the RDF data replication engine had terminated will be backed out by RDF, as described in Section 2.1, "HPE Remote Database Facility (RDF)." However, this is true only for an RDF "soft stop." If RDF is terminated via a "hard stop," the transaction events will remain applied to the target database. They will have to be removed by sending both the Do and the Undo events for the transactions that are active at the point of stoppage to the target database and then committing them as described in Section 8.1, "Brute Force Method". In this case, a brief period of target database inconsistency may occur during the data replication engine switchover and subsequent applying of any such Undo events.

Thereafter, data replication from the source database to the target database proceeds as is normal.

As an alternative embodiment, the second token can contain a list of all transactions that were active, started, or completed from the point of the first token to the point of the second token. The new data replication engine can use this information to decide which transactions it is responsible for replicating and which transactions it should skip, as follows:
- If a transaction begins and ends in between the two tokens, the new data replication engine can disregard it.
- If a transaction ends between the two tokens, the new data replication engine can disregard it.
- However, any transaction that begins and does end at the second token must be replicated by the new data replication engine.

Note that the tokens are not necessarily replicated to the target database. They are used for restart and replay on the source system only. Note also that tokens may be physical or virtual. Note also that the new data replication engine can begin reading and processing the audit trail transaction data prior to the first token, noting that it can disregard any transactions not listed in the first token, or using a TIDFILE or TRACKTXFILE (if available) to avoid replaying them at the target, or replaying them at the target if some brief target database inconsistency is acceptable during the switchover period.

With the Token method, the target database remains consistent during the data replication engine switchover so long as RDF is terminated via a soft stop. If RDF is terminated via a hard stop, the target database will be inconsistent until the partial transactions are backed out.

Since the new data replication engine begins processing transactions in the Audit Trail immediately, source transactions are replicated to the target system immediately and do not dwell on the source system for an extended period of time

9 Alternative Embodiments

9.1 Simplified Token Method

An alternative embodiment for this invention is similar to the Token Method in that it can use the original data replication engine to create the first token position (which may be virtual). In this method, the original data replication engine is responsible for replicating all transactions that complete before the first token position. The new data replication engine will replicate the data for all transactions that span the first token position (i.e., that start before the first token position and complete after the first token position), as well as all transactions that started after the first token position. This method works well when the original and new data replication engines replicate entire transactions (as opposed to just replicating the events in the transactions as is the case with the brute force method).

The Simplified Token Method is illustrated in FIG. 14. A flow chart for the Simplified Token Method is shown in FIG. 15. In this alternative embodiment, the original data replication engine is simply told to shut down or stop (1) (perhaps at a specific point or timestamp in the Audit Trail), and the original data replication engine will report the audit trail position of where it stopped reading/replicating from the Audit Trail. This position is used as input into the new data replication engine as the first token position (2). The original data replication engine thus takes responsibility for replicating all transactions that completed before the first token position.

At startup, the new data replication engine will treat the first token position as discussed in Section 8.1, the Brute Force Method. It will position back into the Audit Trail by a time equal to or greater than the Abort Timer timeout (3) or far enough back to make sure that it processes any transactions that were still active at the position of the first token (no commit or abort event seen yet for that transaction). Note that any transactions that were still in progress from before the Abort Timer timeout period back in the Audit Trail will have been aborted or committed. This is how the Simplified Token Method locates the data for all transactions that had not completed by the first token position. The new data replication engine will take responsibility for replicating these transactions to the target database, along with any other transactions that started after the first token position.

In this way, the Simplified Token Method is a combination of the Brute Force Method and the Token Method for those cases in which the original data replication engine can be counted on to report an accurate Audit Trail position to act as the first token position. This alternative method will not introduce any target database inconsistency as it only replays fully committed transactions, in commit order, once at the target database. Those that completed before the first token position are replayed once (typically in commit order) by the original data replication engine (4, 5), and those that started before the first token position and did not complete before the first token position (6), and those that started after the first token position (7), are replayed by the new data replication engine (8) (also typically once, in commit order).

However, some transactions will be held by the source system for an extended period of time as the new data replication engine positions back by a time equal to or greater than the Abort Timer and searches for transactions that have not yet committed. This potential for additional data loss can be mitigated somewhat by having the new data replication engine immediately replicate all newly generated transactions while it searches backwards for the transactions that spanned the first token position. The new data replication engine will need to reorder these events into commit transaction order at the target before replay.

9.2 Join Method

An alternative embodiment for this invention is to install a data replication engine such as Shadowbase with a transaction "join" capability. This capability allows Shadowbase to join a transaction and to become a voting member for the commit or abort of the transaction. In this approach, the transaction is not allowed to commit until and unless all participants (that have joined the transaction) have voted to allow it to commit.

The Join Method is shown in FIG. 16. A flow chart for the Join Method is shown in FIG. 17. At the time that it is desired to switch data replication engines, Shadowbase will join (1) the next transaction(s) as they start (2) and will not vote (yet) as to the completion of that transaction. This means that the original data replication engine will cease processing the new transactions but will continue to replicate existing transactions thru to their completion. When the status of all non-joined transactions is known (3) (i.e. they completed), the original data replication engine is shutdown (4). Shadowbase votes to commit the delayed transactions (5), thereby taking responsibility for replicating all transactions that were "held up" by the delayed voting as well as any new transactions that are started after that.

Since completed transactions are being replicated, the target database will always be consistent. Transactions delayed by Shadowbase are held by Shadowbase and do not dwell on the source system for an extended period of time, thus minimizing data loss in the event of a source system failure.

In another alternative embodiment, Shadowbase immediately joins all of the existing (active) transactions when it starts up, and then writes out the first token as described in Section 8.2, "Token Method". Shadowbase then immediately votes to allow those transactions to go forward (commit). Processing then continues as documented in that section. If the second token or timestamp approach is needed (because the original data replication engine cannot be stopped immediately), Shadowbase could again note when all of the transactions it joined had completed, thereby creating the second Audit Trail position or timestamp as documented in that section.

9.3 Overlap Method

At the point of switchover, the old data replication engine finishes any transactions in progress before shutting down. The new data replication engine processes all new transactions.

Submethod 1: The old data replication engine replays all transactions that were in process that it has commits for at the time of switchover before the new data replication engine replays anything.

Submethod 2: Intermix the replay of in-process transactions (by the old data replication engine) with new transactions (by the new data replication engine), replaying both in combined commit order (to preserve target transaction consistency). Eventually the old data replication engine will complete replaying any/all transactions it had in process, and it can shut down. The new data replication engine will continue replaying all new transactions from that point forward.

9.4 Inherit Method

The old data replication engine is responsible for replaying all events up to the point of switchover. At this point, the new data replication engine joins all in-process transactions and replays them through to the transaction end state (e.g. commit).

9.5 Unidirectional vs. Bidirectional Replication Environments

In the present embodiment, each data replication engine is responsible for replicating its own specific set of data. A particular event (or transaction) will be replicated and/or applied by one data replication engine or the other, but never both.

9.5.1 Data Oscillation

Bidirectional replication environments pose an additional challenge to avoid data oscillation, as that would result in source (and eventually target) database corruption. Data oscillation occurs when an application event or transaction is replicated from the source and applied to a target database in one direction by one data replication engine, and then incorrectly replicated back and applied to the original source environment by the other (reverse) data replication engine. This can occur because each of the data replication engines does not know about the other data replication engine's transactions. (It is assumed that each data replication engine can properly avoid data oscillation for the transactions that it bidirectionally replicates).

The present invention provides a means to prevent this data oscillation issue that would otherwise occur if not accounted for, as shown in the flowchart of FIG. 18. In this approach, each data replication engine shares information (such as the source transaction id and/or the target side transaction id assigned to replay that source transaction's data at the target) with its target side components. These components thus know which events or transactions should not be reverse-replicated. The TIDFILE and/or TRACKTX-FILE provide examples of the transaction information that the data replication engines can share to avoid data oscillation.

More specifically, the first token discussed in Section 8.2, "Token Method", can be replicated from the source to the target environment. This alerts the target side components of the new data replication engine of the source transaction id's that the original data replication engine is responsible for replicating, and it can use these to map the target transactions it reads from the audit trail to determine which ones should not be reverse-replicated as they were processed and sent by the original data replication engine.

Additionally, if the second token or position is also replicated to the target side, the target side components also know that all completed transactions received before that point were processed by the original data replication engine (and can be discarded), and that all transactions that started before that point and did not complete by that point, or that started after that point, are the responsibility of the new data replication engine; and it should replicate them.

9.5.2 Simplified Bidirectional Method

Assuming that the original data replication engine reports the first token position accurately, the new data replication engine will know that all source transactions that completed before that point were replicated and applied by the original data replication engine and hence should not be replicated back. All transactions that started before and did not complete by the first token position, or that started after the first token position, are the responsibility of the new data replication engine, which uses its normal method of bidirectional cutoff to process them.

9.6 Asynchronous to Synchronous Data Replication Engine Upgrade

The present invention can also be used to upgrade the type of data replication engine technology being used from asynchronous to synchronous (or vice versa). This can be desirable, for example, to take advantage of the synchronous data replication engine's ability to avoid data loss when a catastrophic failure occurs at the source, or to avoid data collisions when running in an active/active data replication architecture.

In an asynchronous data replication engine, the data replication engine and the application are decoupled from each other. They work independently from each other. Hence, it is possible for transactions to be committed at the source but not yet replicated and/or applied to the target environment. This time period is referred to as "replication latency". If a catastrophic failure occurs when this is the case, the source transactions that committed but did not get sent can be lost and may not be recoverable.

Similarly, if the asynchronous data replication engine is running in an active/active application architecture, where the application is actively receiving and processing requests on each system, it is possible that each copy of the application can receive a request at the same time that affects the same database data. If this occurs during the replication latency window, it is possible that both requests cause the databases to be updated to different database values for the affected data, and the data replication engine may not detect nor resolve the data collision. In this case, both databases have different values for the same set of data and both are wrong, resulting in database corruption.

However, for synchronous data replication engines, the application (or at least the DBMS or transaction manager on behalf of the application) and the data replication engine interoperate to perform the synchronous replication effort. This means that the source transaction's commit can be held up until the transaction's data is safe-stored and/or applied into the target database. Hence, data loss is not possible with a synchronous data replication engine.

Similarly, when the synchronous data replication engine is running in an active/active application architecture and it is applying the transaction events into the target database before allowing the commit to occur at the source, data collisions can be avoided if the data replication engine is applying the source transaction's events to the target database before the source commit is allowed to occur. If the previous example's data collision situation occurs, it is not possible for both transactions on each system to both commit . . . one will commit and the other will be prevented from committing because the updated data is locked by the other transaction. Hence, one transaction will abort, the other will commit, and the data collision is avoided.

9.6.1 Method 1

As shown in FIG. 19 and FIG. 20, the present invention provides methods to convert from an asynchronous data replication engine to a synchronous data replication engine. One method to do this is shown in FIG. 19. The new data replication engine joins newly started transactions and then holds up the commits until all data has been sent and safe-stored or applied (to avoid data loss) or applied (to avoid data collisions) for the transactions that had been joined. Note that to avoid having the original data replication engine try to replicate the new transactions, the new data replication engine can hold up the voting on the commit until the original data replication engine has been stopped.

9.6.2 Method 2

Alternatively, as shown in FIG. 20, the new data replication engine can join all existing transactions as well as new transactions. By not voting (delaying its vote) on these transactions, existing transactions as well as new transactions will be replicated by the new synchronous data replication engine.

The original asynchronous data replication engine can be stopped when it has replicated all transactions that were not joined (i.e., when all transactions that exist have been joined by the new data replication engine). The set of joined transactions serves as the list of transactions that the new (synchronous) data replication engine has taken responsibility for replicating.

9.7 Alternate Token Positions

In the present application, the token positions are recorded as time or file position. As an alternative to these positions, some database vendors such as Oracle, Redwood Shores, Calif., USA use the concept of a global sequence number (GSN) which may not be a time or file position. Rather, it represents a state or status that the database has attained. As an alternative embodiment, the GSN or similar representation can be used as an alternative to the time or file position.

10 Summary

There are occasions when it is desirable to change data replication engines. For instance, a data replication engine that is capable only of unidirectional replication may need to be changed to one that is capable of bidirectional replication if the system architecture is being changed from an active/backup architecture to an active/active architecture.

However, in many cases, the application is too critical to allow it to be taken offline so that the data replication engine can be changed. The new data replication engine must be installed and take over replication processing while the application is running in such a way that no replicated data is lost, no data is replayed more than once, and the target database remains consistent while the switchover takes place.

Additionally, the switchover process should not put the data at additional risk of being lost should a source system failure occur while the switchover is taking place.

This invention discloses several methods to allow a data replication engine to be changed while the application is running with no impact on the application nor on the consistency and accuracy of the target database.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for replacing a currently operating data replication engine with a new data replication engine without application downtime and while preserving target database consistency, the currently operating data replication engine and the new data replication engine replicating source database transactions from an audit trail of a source database in a source system to a target database;

the source database including a transaction abort timer having a transaction abort timeout value representing a longest duration that a source database transaction exists before the source database transaction is automatically aborted or removed from the source system;

the method comprising replacing the currently operating data replication engine with the new data replication engine, the replacing comprising the steps of:

(a) the currently operating data replication engine replicating source database transactions including any new source database transactions committed in the audit trail of the source database before the currently operating data replication engine stopped replicating;

(b) the currently operating data replication engine reporting a stopped audit trail position representing a position of the audit trail of the source database where the currently operating data replication engine stopped replicating, the reported stopped audit trail position corresponding to an end position of a position window;

(c) starting the new data replication engine;

(d) positioning the new data replication engine to begin processing source database transactions in the audit trail of the source database at a beginning position, the beginning position located prior to the end position by an amount of time equal to or greater than the transaction abort timeout value, wherein the beginning position and the end position define the position window in the audit trail of the source database;

(e) the new data replication engine replicating source database transactions in the position window, the replicating comprising:

(i) ignoring source database transactions in the position window which had already been committed in the audit trail of the source database, (ii) ignoring source database transactions in the position window which had already been aborted in the audit trail of the source database, and (iii) replicating remaining source database transactions in the position window from the source database to the target database, the remaining source database transactions being source database transactions started and not replicated by the currently operating data replication engine; and (f) using the new data replication engine to replicate all new source database transactions started after the position window.

2. The method of claim 1 wherein the positioning is performed by reading the audit trail in reverse from the stopped audit trail position.

3. The method of claim 1 wherein the processing and replicating occurs in the source database transaction commit order.

* * * * *